Figure 1:
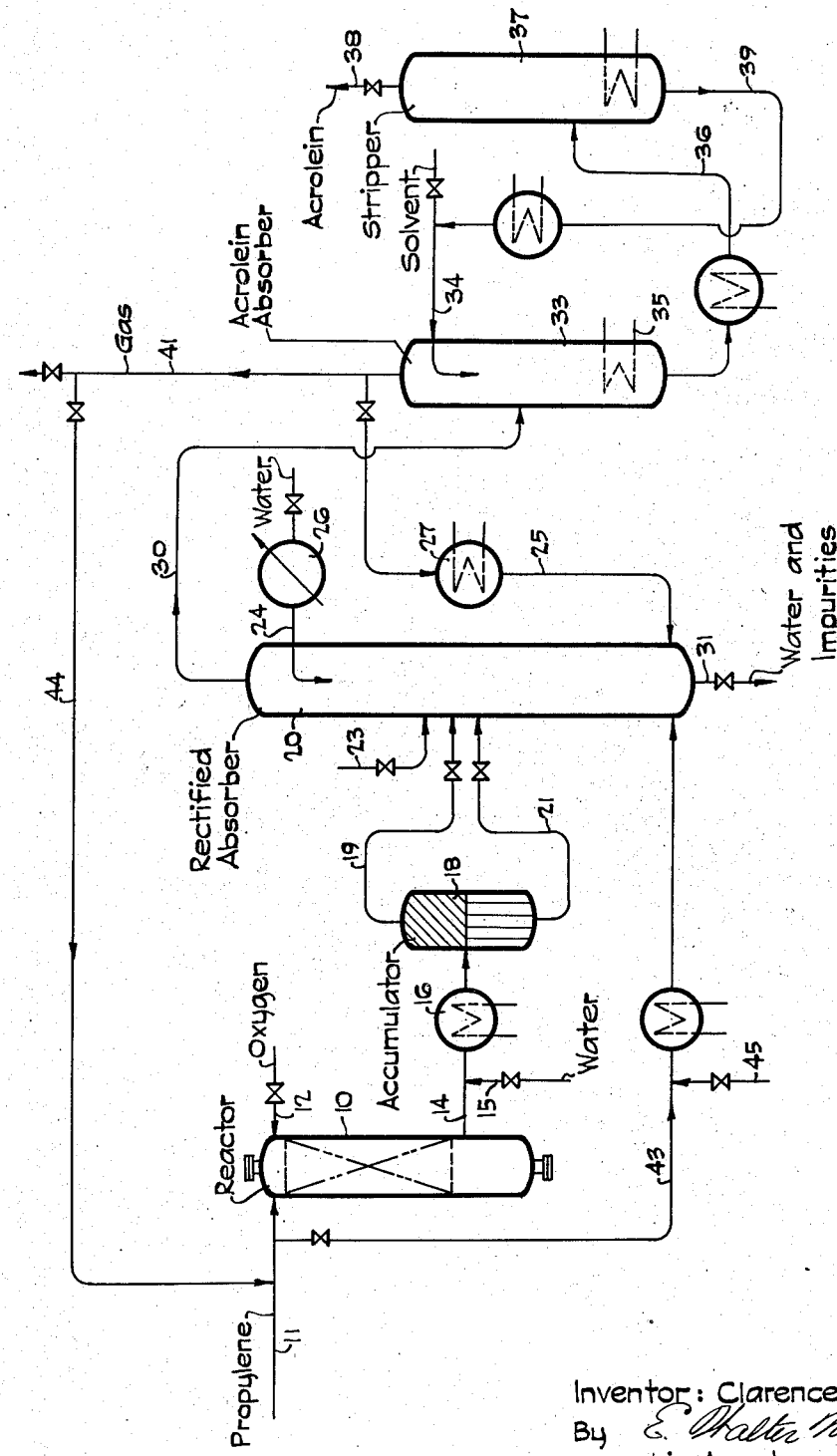
Figure 2:
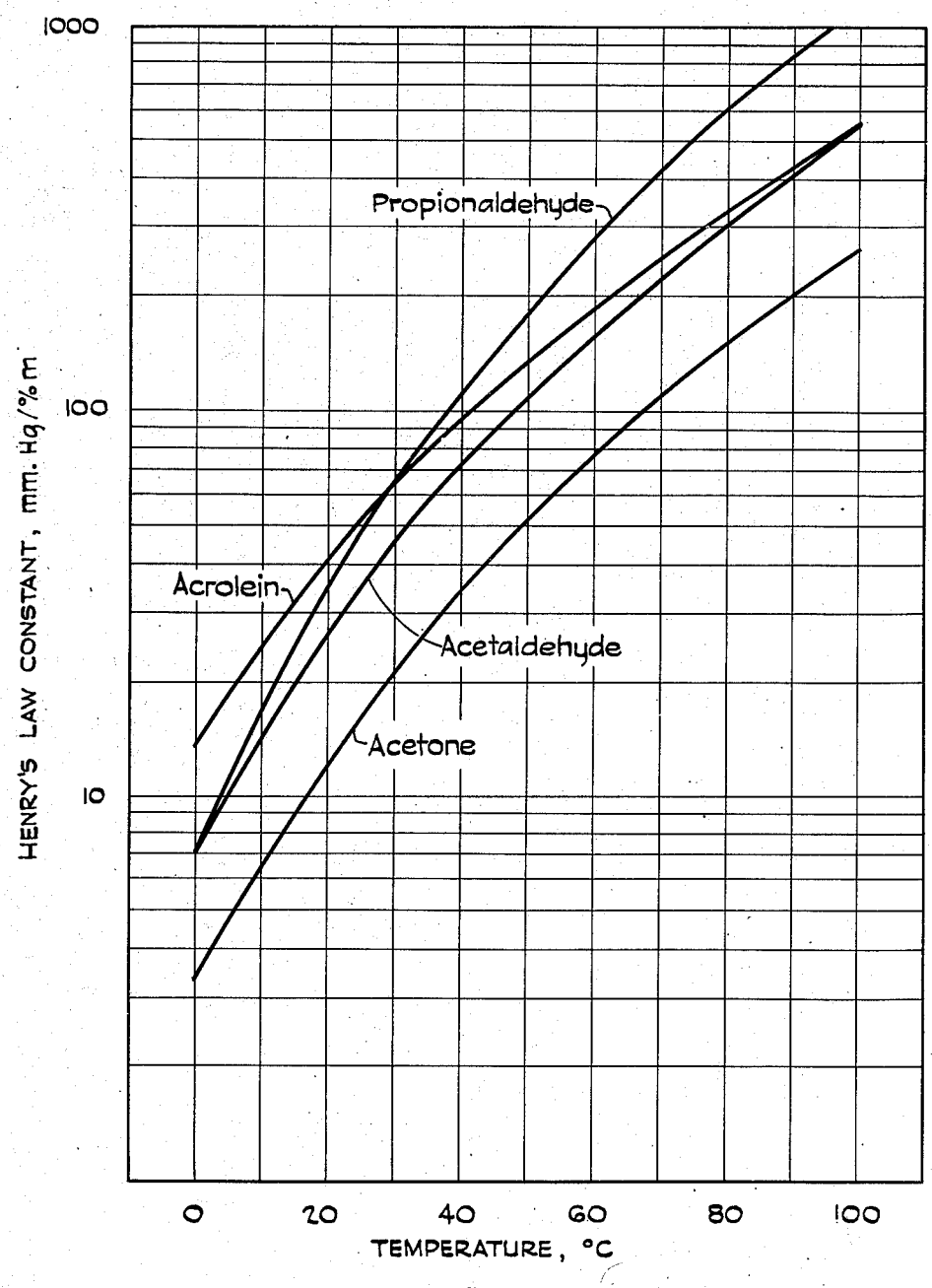

July 11, 1950　　　　　C. L. DUNN　　　　　2,514,968
PURIFICATION OF CRUDE ACROLEIN BY RECTIFIED ABSORPTION
Filed April 15, 1949　　　　　　　　　　　　2 Sheets-Sheet 1

Inventor: Clarence L. Dunn
By  E. Walter Mark
his Agent

UNITED STATES PATENT OFFICE 2,514,968

PURIFICATION OF CRUDE ACROLEIN BY RECTIFIED ABSORPTION

Clarence L. Dunn, Berkeley, Calif., assignor to Shell Development Company, San Francisco, Calif., a corporation of Delaware Application April 15, 1949, Serial No. 87,608

13 Claims. (Cl. 183—115)

This invention relates to the production of high purity acrolein from hydrocarbon oxidation products comprising acrolein in admixture with close boiling saturated carbonylic compounds inseparable therefrom by practical scale fractionating means. A particular aspect of the invention relates to the production of acrolein in a state of high purity from mixtures comprising acrolein in admixture with propionaldehyde and/or acetone.

Production of the unsaturated aldehydes on a practical scale generally results in the obtaining of a crude product comprising the unsaturated aldehydes in admixture with substantial amounts of by-products unavoidably formed during the process. The ability to utilize the unsaturated aldehydes efficiently in many fields of application is often dependent upon the absence therein of any substantial amount of impurities. The large scale production of an unsaturated aldehyde of relatively high purity is, of necessity, limited to methods enabling the obtaining of a product comprising the unsaturated aldehyde in admixture with impurities which are readily separable therefrom by available practical scale separating means. Thus, the production of acrolein from such starting materials, as for example, acetaldehyde and formaldehyde under carefully controlled conditions often enables the attainment of a product comprising the acrolein in admixture with impurities consisting essentially of acetaldehyde, formaldehyde and relatively high boiling organic materials. All of such impurities are readily separable from the acrolein on a practical scale by methods available heretofore comprising such steps as simple fractionation, water scrubbing, distillation and the like. Although acrolein of relatively high purity is often obtained by such methods these processes are generally handicapped by unavailbility at sufficiently low cost of the starting materials. It has recently been found that the readily available olefinic hydrocarbons can be converted efficiently to products consisting predominantly of unsaturated aldehydes such as, for example, the alpha-beta unsaturated aliphatic aldehydes, by catalytic oxidation in the presence of specific catalysts. Thus, acrolein and methacrolein are obtained by the catalytic oxidation of propylene and isobutylene, respectively. The products obtained in such catalytic hydrocarbon oxidations, however, comprise besides the desired unsaturated aldehydes, saturated carbonylic compounds such as, saturated aldehydes and ketones inseparable therefrom on a practical scale by methods disclosed heretofore. The production of an alpha-beta unsaturated aliphatic aldehyde from the corresponding olefin, such as, for example, the production of acrolein from propylene results in the production of a product comprising the acrolein in admixture not only with readily separable impurities such as formaldehyde, acetaldehyde and high boiling material but also close boiling carbonylic compounds such as, for example, propionaldehyde and acetone, inseparable therefrom on practical scale by separating means generally employed heretofore. Inability to effect the efficient and yet substantially complete removal of close boiling carbonylic compounds from the unsaturated aldehydes has militated against any full realization of the substantial advantages inherent in the utilization of the readily available hydrocarbons as a source of these highly desirable and valuable compounds.

In copending applications Serial No. 1,314, filed January 9, 1948, and Serial No. 49,816, filed September 17, 1948, respectively, there are described and claimed methods enabling the production of an unsaturated aldehyde of high purity from crude unsaturated aldehyde containing saturated carbonylic impurities having boiling temperatures closely approximating that of the unsaturated aldehydes, by subjecting the crude material to extractive distillation in the presence of a suitable solvent. In copending application Serial No. 84,074 filed March 29, 1949, a method has been disclosed enabling the purification of crude acrolein by extraction in the liquid phase employing water as the selective solvent in the presence of a secondary organic solvent. These methods enabling the obtaining of the unsaturated aldehyde in a relatively high state of purity necessitate the use of operational procedures the need to the resort of which may at times detract from economical application of the process.

It is an object of the present invention to provide an improved process for the more efficient purification of crude acrolein obtained by the oxidation of hydrocarbons.

Another object of the invention is the provision of an improved process for the more efficient separation of acrolein from admixture with saturated carbonylic compounds having the same number of carbon atoms to the molecule.

A particular object of the invention is the provision of an improved process for the more efficient purification of the crude acrolein obtained by the catalytic oxidation of propylene.

A still more specific object of the invention is the provision of an improved process enabling the more efficient separation of acrolein from mixtures comprising acrolein in admixture with propionaldehyde. Other objects and advantages of the invention will become apparent from the following detailed description thereof.

It has now been found that acrolein is obtained in a high state of purity from mixtures containing the acrolein in admixture with saturated carbonylic impurities having boiling temperatures approximating that of the acrolein by subjecting the acrolein-containing mixtures to rectified absorption, using water as solvent, at a temperature below about 30° C.

In accordance with the process of the invention crude acrolein comprising acrolein in admixture with close boiling saturated carbonylic impurities such as, for example, propionaldehyde and/or acetone, is introduced into a rectified absorber wherein it is passed upwardly countercurrent to a descending stream of liquid absorbing medium, such as water, at a temperature below about 30° C. Acrolein is selectively stripped from the absorbing medium within the rectified absorption zone. Since selective absorption of the carbonylic impurities from acrolein depends on operation at a low temperature, that is below about 30° C., the stripping action must be secured by a gaseous medium rather than by heat input. A gaseous medium is therefore continuously introduced into a lower part of the rectified absorber and passed upwardly through the column countercurrent to the descending stream of water. Acrolein-containing gaseous stripping medium, free of any substantial amount of saturated carbonylic compounds, is taken overhead from the rectified absorber. Water, containing substantially all saturated carbonylic impurities introduced into the rectified absorber, is removed as bottoms. Overhead from the rectified absorber is passed into an acrolein absorption zone wherein acrolein is separated from the gaseous stripping medium by contact with a solvent selectively absorbing the acrolein. Gas, free of any substantial amount of acrolein, leaving the acrolein absorption zone is returned to the rectified absorption zone to be used therein as the gaseous stripping medium. Acrolein is separated in a high state of purity from the rich solvent taken from the acrolein absorption zone by distillation.

The process of the invention is applied with particular advantage to the separation of acrolein from mixtures such as hydrocarbon oxidation products. In the oxidation of hydrocarbons, such as propylene and the like, to acrolein-containing products, the effluence from the oxidation zone will comprise the acrolein in admixture not only with such close boiling saturated carbonylic impurities as propionaldehyde and acetone, but also with such impurities as acetaldehyde, formaldehyde, and high boiling hydrocarbon oxidation products, together with substantial amounts of normally gaseous materials. The process of the invention enables the separation in a single operative step substantially all of such impurities. A further signal advantage of the process of the invention resides in the ability to introduce the entire acrolein-containing reaction products into the rectified absorption zone without the need for any initial separation of normally gaseous or high boiling materials therefrom, for, not only are the higher boiling materials removed with the solvent in the rectified absorption zone but the normally gaseous materials therein provide an economical source of stripping medium for the rectified absorption step.

In order to set forth more fully the nature of the invention it will be described in detail with reference to the attached drawing wherein Fig. I illustrates more or less diagrammatically one form of apparatus suitable for execution of the process of the invention, and Fig. II is a graph showing the relation between temperature and Henry's law constant for acrolein, propionaldehyde, acetone and acetaldehyde.

The crude acrolein, comprising acrolein in admixture with close-boiling saturated carbonylic impurities to be purified in accordance with the invention may be obtained from any suitable source. The crude acrolein-containing mixture may consist, for example, of the products obtained by the catalytic oxidation of propylene. Thus, in the drawing the reactor 10 represents a hydrocarbon oxidizing zone receiving normally gaseous hydrocarbons comprising propylene from an outside source by means of valved line 11, and oxygen, or an oxygen-containing gas, from a suitable source by means of valved line 12. Within reactor 10 the mixture of oxygen and hydrocarbons is contacted with a catalyst under oxidizing conditions resulting in the conversion of propylene to reaction products comprising acrolein. A method for the production of acrolein by the catalytic oxidation of propylene is described and claimed in copending application Serial No. 476,786, filed June 26, 1947, now abandoned. Effluence is taken from reactor 10 through line 14. Such effluence will comprise besides acrolein substantial amounts of normally gaseous materials such as propylene, oxides of carbon, and if air is employed as the source of oxygen substantial amounts of nitrogen. The effluence will furthermore comprise in addition to such materials as acetaldehyde, formaldehyde and high boiling organic products, substantial amounts of saturated carbonylic compounds such as acetone and propionaldehyde, the boiling temperatures of which closely approximate that of acrolein.

When the crude acrolein-containing mixture to be treated in accordance with the invention consists essentially of the effluence of a hydrocarbon oxidizing zone the reactor effluence is first reduced in temperature. Such temperature reduction may be carried out by quenching with water introduced into line 14 by means of valved line 15 and by additional cooling means such as, for example, a heat exchanger 16.

The cooled reactor effluence is discharged from line 14 into an accumulator 18. Within accumulator 18 a liquid phase comprising quench water, acrolein, formaldehyde, acetaldehyde, propionaldehyde, acetone and higher boiling organic compounds separates from a gaseous phase comprising the normally gaseous materials of the reactor effluence in admixture with acrolein, and saturated carbonylic compounds such as, acetaldehyde, propionaldehyde and acetone.

The gaseous phase is taken from accumulator 18 through line 19 and passed into a suitable rectified absorption zone comprising, for example, a rectified absorber 20. Liquid phase is passed from accumulator 18 through line 21 into rectified absorber 20. It is to be understood that the invention is in no wise limited to the use of a column-type absorber and any suitable type of contacting device may be comprised in the absorption zone enabling efficient contact of the solvents and crude acrolein charge.

The composition of the highly complex mixture constituting the effluence from a propylene oxidizing zone, such as reactor 10, will vary considerably in accordance with the nature of the materials charged thereto and the conditions maintained therein. The acrolein will, however, generally always be encountered in admixture with saturated carbonylics comprising acetaldehyde, propionaldehyde and acetone. The following table is illustrative of the composition of the mixture of acrolein and such close boiling saturated carbonylics encountered in the total reactor effluence:

| | Per cent by weight |
|---|---|
| Acrolein | 80 to 90 |
| Acetaldehyde | 3 to 10 |
| Propionaldehyde | 0.5 to 3 |
| Acetone | 1.0 to 5 |

The normally gaseous components such as, for example, nitrogen, propylene, and carbon dioxide will generally constitute the greater part of the reactor effluence.

It is seen that in addition to acetaldehyde the carbonylic impurities present in the crude acrolein include propionaldehyde and acetone. These saturated compounds are not only lower boiling and higher boiling, respectively, than acrolein but have boiling temperatures which so closely approximate that of acrolein as to preclude their separation therefrom by practical scale fractionating means.

It is to be understood that the invention is in no wise limited to the purification of a crude acrolein of any specific source and that the invention may be applied broadly to the separation of acrolein from crude acrolein, containing acrolein in admixture with close boiling saturated carbonylic compounds, from any source. A valved line 23 is provided for the introduction of crude acrolein comprising acrolein in admixture with close boiling carbonylics from any outside source directly into rectified absorber 20. The crude acrolein thus introduced into the system through valved line 23 may constitute at least a substantial part, or all, of the crude acrolein charged to the system.

Within rectified absorber 20 the acrolein-containing charge is contacted with a downward flowing stream of water introduced into an upper part of rectified absorber by means of valved line 24. It has been found that by maintaining the temperature of the rectified absorber below about 30° C. substantially selective absorption of all saturated carbonylic impurities in the water is obtained. Since the selective absorption of the carbonylic impurities from acrolein depends upon operation at a low temperature, i. e. below 30° C., heat cannot be resorted to to strip acrolein from the absorption mixture. Selective removal of acrolein from the downcoming absorption liquor is therefore effected within rectified absorber 20 by the passage of a gaseous stripping medium upwardly therethrough. The gaseous stripping medium is introduced into the lower part of rectified absorber 20 by means of line 25.

Although the selective removal of acrolein from the crude-acrolein-containing charge is attained at temperatures below 30° C., for example, from about 0° C. to about 30° C., it is preferred to use a temperature below about 20° C. Particularly preferred is the use of a temperature in the range of from about 0° C. to about 15° C.

The low temperature is maintained within rectified absorber 20 by cooling the water and gaseous stripping medium introduced therein. Thus the solvent water and gaseous stripping medium may be cooled to a temperature within the prescribed range by suitable cooling means such as, for example, heat exchangers 26 and 27, respectively, and optionally by other means not disclosed in the drawing.

Under the above defined conditions, overhead from rectified absorber 20 removed therefrom through line 30 will consist essentially of acrolein and normally gaseous materials introduced as stripping medium and with the crude-acrolein containing charge. Liquid material is drawn from the lower part of rectified absorber 20 through valved line 31. Liquid thus withdrawn through valved line 31 will comprise the solvent water containing not only substantially all formaldehyde and the organic compounds substantially higher boiling than acrolein introduced into column 20, but will also include substantially all saturated carbonylic impurities close boiling to acrolein such as propionaldehyde and acetone originally present in the crude acrolein-containing charge introduced into rectified absorber 20.

Criticality of the temperature of about 30° C. in the process of the invention has been substantiated by a study of the properties in aqueous solution at low temperatures of the saturated carbonylics, the boiling temperatures of which approximate that of acrolein. Fig. II of the drawing shows the variation with temperature of Henry's law constants from water solutions for acrolein and close boiling saturated carbonylics. It is seen therefrom that separation of propionaldehyde from acrolein at a temperature above about 30° C. is not possible, but that separation of substantially all saturated carbonylic compounds close boiling to acrolein, including even propionaldehyde, is made possible by maintaining a temperature below 30° C. in the rectified absorber 21.

Any material which is in the gaseous state, substantially inert, and insoluble in water, under the conditions prevailing in rectified absorber 20 may be used as the gaseous stripping medium therein. Such suitable stripping media comprise, for example, nitrogen, hydrogen, oxygen, carbon dioxide, carbon monoxide, air, the normally gaseous hydrocarbons such as methane, ethane, propane, ethylene, propylene, butane, butylene, acetylene, mixtures thereof, such as normally gaseous hydrocarbon fraction and the like. In a particularly preferred method of carrying out the invention as applied to the treatment of oxidation products of hydrocarbons, the stripping medium employed comprises the normally gaseous materials contained in the crude acrolein-containing charge and comprising, for example, one or more such components as propylene, carbon dioxide, nitrogen, etc. To this effect the normally gaseous constituents are removed from the overhead from rectified absorber 20 and recycled thereto as described below.

Acrolein is recovered from the gaseous stripping medium by any suitable means. In a preferred method of executing the invention the gaseous acrolein-containing overhead from rectified absorber 20 is passed through line 30 into an acrolein absorption zone comprising, for example, acrolein absorption column 33. Within column 33 the gaseous acrolein-containing stream is contacted with a liquid solvent selectively dissolving, or absorbing, acrolein. The selective solvent for acrolein is introduced into the upper part of acrolein absorption column 33 by means of valved line 34. Suitability of a particular solvent for acrolein employed will depend to some extent upon the nature of the gaseous materials admixed with the acrolein.

When the gaseous materials comprise normally gaseous hydrocarbons, such as, for example, propylene, suitable solvents for acrolein comprise, for example, water, aromatic hydrocarbons such as toluene and xylene, olefinic hydrocarbons such as propylene, butylene or higher paraffinic hydrocarbons such as propane, butane or higher as well as oxygenated compounds which have suitable boiling points and are chemically unreactive with acrolein, e. g., methyl isobutyl ketone, etc. Temperature conditions within column 33 may vary in accordance with the particular solvent for acrolein employed. When using water as the solvent, the temperature may range, for example, from about 0 to about 50° C. Heating means, such as, for example, a closed coil 35 and optionally other temperature controlling means not shown in the drawing are provided to assure the removal of the gaseous components from the acrolein-rich solvent in absorber 33.

Acrolein-rich solvent is passed from absorber 33 through line 36 into a stripper 37. Within stripper 37 acrolein is stripped from the solvent. Acrolein in a high state of purity, free from any substantial amount of saturated carbonylics is taken overhead from stripper 37 through valved line 38. Lean solvent is returned from the lower part of stripper 37 through line 39 into line 34 leading into the upper part of acrolein absorber 33.

Gases, free of any substantial amount of acrolein, are taken overhead from acrolein absorber 33 by means of valved line 41. At least a part of such gas is recycled through line 25 to the lower part of the rectified absorber 20 to be used as the stripping medium therein. When the crude acrolein-containing charge to the process consists of the effluence from a propylene conversion zone the gaseous stream recycled through line 25 will comprise the normally gaseous constituents such as propylene, nitrogen, carbon dioxide, and the like, contained in such charge. Such application of the invention to the purification of the effluence from a propylene conversion zone results in a highly economical and efficient process. Thus, not only is the efficient separation of acrolein attained with a readily available and cheap solvent, but the crude acrolein-containing charge provides the necessary gaseous stripping agent for the rectified absorption zone. A further advantage is the absence of the need for any processing steps directed to the removal of components from the effluence of the hydrocarbon oxidizing zone prior to its introduction into the acrolein recovery system.

The stripping medium introduced into rectified absorber 20 may comprise in addition to gases recycled through line 25 normally gaseous hydrocarbons such as propylene passed thereto from line 11 by means of valved line 43. A valved line 44 is also provided for the passage of at least a part of the gas passing through valved line 41 to line 11 leading into reactor 10.

A valved line 45 is provided for the introduction of a gaseous stripping medium into the system from an outside source. Gaseous stripping medium is thus introduced through valved line 45 when the crude-acrolein-containing charge introduced into rectified absorber 20 does not contain a substantial amount of normally gaseous material suitable as stripping agent. The addition of gas into the system by means of valved line 45 to supplement the stripping function of normally gaseous materials present in the crude acrolein-containing charge may be resorted to within the scope of the invention.

The following examples are illustrative of the invention:

EXAMPLE I

An acrolein-containing mixture consisting of the total effluence of a hydrocarbon oxidation zone wherein propylene is subjected to oxidation, is cooled to a temperature of about 5° C. and introduced into a rectified absorber. The acrolein-containing mixture thus charged to the rectified absorber contained 28.2 moles of normally gaseous material, consisting predominantly of a mixture of propylene, nitrogen, carbon dioxide and oxygen, for each mole of total carbonyl compounds. The total carbonyl compounds in the mixture had the following composition:

| | Percent by weight |
|---|---|
| Acrolein | 90.0 |
| Acetaldehyde | 6.0 |
| Propionaldehyde | 2.0 |
| Acetone | 2.0 |

Water is continuously introduced into the top of rectified absorber and withdrawn from the bottom thereof. Stripping gas is introduced into the bottom of the rectified absorber and taken from the top thereof. The rectified absorption is executed under the following conditions:

*Feed rate: moles/mole acrolein-containing feed charged*

| | |
|---|---|
| Water | 0.47 |
| Stripping gas | 1.81 |
| Temperature ° C | 5 |
| Pressure psia | 125 |

The stripping gas employed consists of the mixture of normally gaseous constituents comprised in the acrolein-containing mixture charged to the rectified absorber which was recycled from the acrolein absorber as described below. The acrolein-containing gas taken overhead from the rectified absorber is introduced into an acrolein absorber wherein it was contacted with a countercurrently flowing stream of water of a temperature of 20° C. thereby selectively absorbing the acrolein in the water. Acrolein-free gas, taken overhead from the acrolein-absorber and consisting essentially of a mixture of propylene, nitrogen, carbon dioxide, and oxygen, is recycled to the lower part of the rectified absorber and used as the stripping gas therein. Acrolein is stripped from the acrolein-rich water solvent withdrawn from the acrolein absorber and is found to have a purity of 99.4% by weight (on a water-free basis). An acrolein recovery of 96.2% is obtained based on acrolein charged to the rectified absorber.

EXAMPLE II

Crude acrolein obtained by the catalytic oxidation of propylene is subjected to phase separation in a separator. The gaseous phase is scrubbed with water at a pressure of about 90 pounds gauge to recover crude acrolein therefrom. The rich scrubbing water is combined with the liquid phase from the separator and subjected to distillation. Crude acrolein is separated as a vapor fraction from a liquid bottom comprising water, formaldehyde and high boiling organic material. The crude acrolein thus obtained has the following composition:

| | Percent by weight |
|---|---|
| Acrolein | 90.0 |
| Acetaldehyde | 6.0 |
| Propionaldehyde | 2.0 |
| Acetone | 2.0 |

On a water-free basis the crude acrolein actually contained about 3% water.

The crude acrolein thus obtained is subjected to rectified absorption using water as the liquid absorbent and propylene as the stripping gas. The rectified absorption is carried out under the following conditions:

*Feed rate to rectified absorber*

| | | |
|---|---|---|
| Crude acrolein | pounds | 1.0 |
| Water | do | 20.5 |
| Inert gas | do | 29.0 |
| Temperature °C | | 5 |
| Pressure psia | | 90 |

The acrolein-containing gaseous overhead from the rectified absorber is introduced into an absorber wherein it is contacted countercurrently with water at a temperature of 20 C°. Gaseous overhead from the acrolein absorber is returned as stripping gas to the rectified absorber. Acrolein is stripped from the acrolein rich water solvent leaving the acrolein absorber and is found to have a purity of 99% (water-free basis). The saturated carbonylic content of the acrolein product is found to be approximately as follows:

| | Percent by weight |
|---|---|
| Acetaldehyde | 0.3 |
| Propionaldehyde | 0.3 |
| Acetone | <0.5 |

A recovery of acrolein of 95% is attained.

The invention claimed is:

1. The process for separating acrolein in a high state of purity from a mixture comprising acrolein in admixture with propionaldehyde which comprises contacting said mixture with a stream of water flowing countercurrent to a stream of inert gas at a temperature of from about 0° C. to about 15° C. in a rectified absorption zone, thereby forming a gaseous phase consisting essentially of said stripping gas in admixture with acrolein free of any substantial amount of propionaldehyde and a liquid phase consisting essentially of water containing propionaldehyde free of any substantial amount of acrolein in said rectified absorption zone, and separating acrolein in a high state of purity from said gaseous phase.

2. The process for separating acrolein in a high state of purity from a mixture comprising acrolein in admixture with propionaldehyde-containing saturated carbonylic impurities, which comprises contacting said mixture with a stream of water flowing countercurrent to a stream of inert stripping gas at a temperature of from about 0° C. to about 30° C. in a rectified absorption zone, thereby forming a gaseous phase consisting essentially of said stripping gas in admixture with acrolein free of any substantial amount of said carbonylic impurities and a liquid phase consisting essentially of water containing said carbonylic impurities free of any substantial amount of acrolein in said rectified absorption zone, and separating acrolein in a high state of purity from said gaseous phase.

3. The process in accordance with claim 2 wherein said inert gas is a normally gaseous hydrocarbon stream consisting essentially of propylene.

4. The process in accordance with claim 2 wherein said inert gas is a normally gaseous hydrocarbon.

5. The process in accordance with claim 2 wherein said inert gas consists essentially of a mixture of the normally gaseous constituents comprised in a reaction mixture obtained by the catalytic oxidation of propylene.

6. The process in accordance with claim 2 wherein said rectified absorption is executed at a temperature of from about 0° C. to about 15° C.

7. The process for separating acrolein in a high state of purity from an acrolein-containing reaction mixture containing said acrolein in admixture with propionaldehyde and a fixed gas, which comprises contacting said reaction mixture with water flowing countercurrent to a stream of gaseous stripping medium at a temperature of from about 0° C. to about 30° C. in a rectified absorption zone, thereby separating a gaseous phase comprising said fixed gas in admixture with acrolein free of any substantial amount of propionaldehyde and a liquid phase comprising water containing propionaldehyde free of any substantial amount of acrolein in said rectified absorption zone, separating acrolein and said fixed gas from said gaseous phase, and recycling said separated fixed gas to said rectified absorption zone to be used therein as said gaseous stripping medium.

8. The process in accordance with claim 7 wherein said rectified absorption is carried out at a temperature in the range of from about 0° C. to about 15° C.

9. The process for separating acrolein in a high state of purity from an acrolein-containing reaction mixture obtained by the oxidation of normally gaseous hydrocarbons comprising propylene, said reaction mixture comprising acrolein in admixture with propionaldehyde-containing saturated carbonylic impurities and propylene-containing gaseous constituents, which comprises contacting said reaction mixture with water flowing countercurrent to a gaseous stripping medium at a temperature of from about 0° C. to about 30° C. in a rectified absorption zone, thereby separating a gaseous phase comprising acrolein in admixture with said gaseous constituents substantially free of carbonylic impurities and a liquid phase comprising water containing said carbonylic impurities in said rectified absorption zone, separating acrolein and said normally gaseous constituents from said gaseous phase, and recycling said separated normally gaseous constituents to said rectified absorption zone to be used therein as said gaseous stripping medium.

10. The process for separating acrolein in a high state of purity from an acrolein-containing reaction mixture containing said acrolein in admixture with propionaldehyde and a fixed gas, which comprises contacting said reaction mixture with water flowing countercurrent to a stream of gaseous stripping medium at a temperature of from about 0° C. to about 30° C. in a rectified absorption zone, thereby separating a gaseous phase comprising said fixed gas in admixture with acrolein free of any substantial amount of propionaldehyde and a liquid phase comprising water containing propionaldehyde free of any substantial amount of acrolein in said rectified absorption zone, passing said gaseous phase from said rectified absorption zone into an acrolein absorption zone, contacting said gaseous phase with water in said acrolein absorption zone thereby selectively absorbing acrolein from said gaseous phase with the formation of a liquid phase comprising water containing acrolein while leaving a gaseous phase comprising said fixed gas free of any substantial amount of acrolein in said acrolein absorption zone, passing said gaseous phase comprising fixed gas free of any substantial amount of acrolein from said acrolein absorption zone to said rectified absorption zone to be used as said gaseous stripping medium therein, and distilling acrolein in a high state of purity from said liquid phase formed in said acrolein absorption zone.

11. The process in accordance with claim 10 wherein said rectified absorption is executed at a temperature of from about 0° C. to about 15° C.

12. The process for separating acrolein in a high state of purity from an acrolein-containing reaction mixture obtained by the oxidation of normally gaseous hydrocarbons comprising propylene, said reaction mixture comprising acrolein in admixture with propionaldehyde-containing saturated carbonylic impurities and propylene-containing gaseous constituents, which comprises contacting said reaction mixture with water flowing countercurrent to a gaseous stripping medium at a temperature of from about 0° C. to about 30° C. in a rectified absorption zone, thereby separating a gaseous phase comprising acrolein in admixture with said gaseous constituents substantially free of carbonylic impurities and a liquid phase comprising water containing said carbonylic impurities in said rectified absorption zone, passing said gaseous phase from said rectified absorption zone into an acrolein absorption zone, contacting said gaseous phase with water in said acrolein absorption zone thereby selectively absorbing acrolein from said gaseous phase with the formation of a liquid phase comprising water containing acrolein while leaving a gaseous phase comprising said propylene-containing gaseous constituents substantially free of acrolein in said acrolein absorbing zone, passing said gaseous phase comprising said propylene-containing gaseous constituents substantially free of acrolein from said acrolein absorption zone to said rectified absorption zone to be used therein as said gaseous stripping medium, and distilling acrolein in a high state of purity from said liquid phase formed in said acrolein absorption zone.

13. The process in accordance with claim 7 wherein acrolein is separated from said gaseous phase separated in said rectified absorption zone by contacting said gaseous phase with a selective solvent for acrolein.

CLARENCE L. DUNN.

REFERENCES CITED

The following references are of record in the file of this patent:

UNITED STATES PATENTS

| Number | Name | Date |
|---|---|---|
| 2,334,091 | Herstein | Nov. 9, 1943 |
| 2,381,092 | Wilson | Aug. 7, 1945 |